United States Patent [19]
Dvorkis et al.

[11] Patent Number: 5,600,119
[45] Date of Patent: Feb. 4, 1997

[54] DUAL LINE LASER SCANNING SYSTEM AND SCANNING METHOD FOR READING MULTIDIMENSIONAL BAR CODES

[75] Inventors: Paul Dvorkis, Stony Brook; David P. Goren, Bonkonkoma; Glenn S. Spitz, Far Rockaway; Daniel R. McGlynn, Brooklyn, all of N.Y.

[73] Assignee: Symbol Technologies, Inc., Holtsville, N.Y.

[21] Appl. No.: 542,517

[22] Filed: Oct. 13, 1995

Related U.S. Application Data

[63] Continuation of Ser. No. 294,438, Aug. 23, 1994, abandoned, which is a continuation of Ser. No. 37,143, Mar. 25, 1993, abandoned, which is a division of Ser. No. 715,267, Jun. 14, 1991, Pat. No. 5,235,167, which is a continuation-in-part of Ser. No. 506,674, Apr. 9, 1990, abandoned, which is a continuation of Ser. No. 260,692, Oct. 21, 1988, Pat. No. 4,933,538.

[51] Int. Cl.⁶ .................................................. G06K 7/10
[52] U.S. Cl. ................................................... 235/462
[58] Field of Search ................................ 235/462, 467, 235/470, 472, 438

[56] References Cited

U.S. PATENT DOCUMENTS

| | | | |
|---|---|---|---|
| 4,418,276 | 11/1983 | Yatsunami | 235/462 |
| 4,916,297 | 4/1990 | Tukada et al. | 235/462 |
| 4,933,538 | 6/1990 | Heiman et al. | 235/462 |
| 5,086,215 | 2/1992 | Carsner et al. | 235/470 |
| 5,115,121 | 5/1992 | Bianco et al. | 235/470 |
| 5,117,098 | 5/1992 | Swartz | 235/472 |
| 5,168,149 | 12/1992 | Dvorkis et al. | 235/472 |

FOREIGN PATENT DOCUMENTS

| | | | |
|---|---|---|---|
| 0384955 | 9/1990 | European Pat. Off. | 235/462 |
| 100230 | 8/1979 | Japan | 235/462 |
| 238977 | 11/1985 | Japan | 235/462 |
| 0238977 | 11/1985 | Japan | 235/462 |
| 0198175 | 8/1991 | Japan | 235/462 |
| 198175 | 8/1991 | Japan | 235/462 |
| 3266089 | 11/1991 | Japan | 235/462 |

*Primary Examiner*—John Shepperd

[57] ABSTRACT

A system for reading bar code symbols or the like, having a scanner for generating a laser beam directed toward a target and producing a first narrowly spaced apart dual line scanning pattern that enables the user to manually aim and direct the beam to the location desired by the user and a relatively wider spaced apart dual line second scanning pattern that sweeps an entire symbol to be read, and a detector for receiving reflected light from such symbol to produce electrical signals corresponding to data represented by such symbol.

6 Claims, 10 Drawing Sheets

DUAL LINE LASER SCANNING SYSTEM AND SCANNING METHOD FOR READING MULTIDIMENSIONAL BAR CODES

RELATED CASES

This application is a continuation of U.S. patent application Ser. No. 08/294,438 filed Aug. 23, 1994, now abandoned which in turn is a continuation of U.S. patent application Ser. No. 08/037,143 filed Mar. 25, 1993, now abandoned which in turn is a division of U.S. patent application Ser. No. 07/715,267 filed Jun. 14, 1991, now U.S. Pat. No. 5,235,167 which in turn is a continuation in part of U.S. patent application Ser. No. 07/506,674 filed Apr. 9, 1990, now abandoned which is a continuation of U.S. patent application Ser. No. 07/260,692 filed Oct. 21, 1988, now U.S. Pat. No. 4,933,538. This application is further related to U.S. patent application Ser. No. 317,433, filed Mar. 1, 1989, to U.S. patent application Ser. No. 520,464, filed May 8, 1990, and U.S. patent application Ser. No. 544,628, filed Jun. 27, 1990 all of said applications being assigned to Symbol Technologies, Inc.

BACKGROUND OF THE INVENTION

1. Field of the Invention

This invention generally relates to the design of laser scanning systems for reading bar code symbols or similar indicia and, more particularly, to method of changing the scanning pattern of a raster scan in order to more effectively read two dimensional bar code symbols. 2. Description of the Related Art Various optical readers and optical scanning systems have been developed heretofore for reading bar code symbols appearing on a label or on the surface of an article. The bar code symbol itself is a coded pattern of indicia comprised of a series of bars of various widths spaced apart from one another to bound spaces of various widths, the bars and spaces having different light-reflecting characteristics. The readers and scanning systems electro-optically transform the graphic indicia into electrical signals, which are decoded into alphanumerical characters that are intended to be descriptive of the article or some characteristic thereof. Such characters are typically represented in digital form and utilized as an input to a data processing system for applications in point-of-sale processing, inventory control, and the like. Scanning systems of this general type have been disclosed, for example, in U.S. Pat. Nos. 4,251,798; 4,360, 798; 4,369,361; 4,387,297; 4,409,470 and 4,460,120, all of which have been assigned to the same assignee as the instant application.

As disclosed in some of the above patents, one embodiment of such a scanning system resides, inter alia, in a hand-held, portable laser scanning head supported by a user, which is configured to allow the user to aim the head, and more particularly, the light beam, at a target and a symbol to be read.

The light source in a laser scanner is typically a gas laser or semiconductor laser. The use of semiconductor devices as the light source in scanning systems is especially desirable because of their small size, low cost and low power requirements. The laser beam is optically modified, typically by a lens, to form a beam spot of a certain size at the target distance. It is preferred that the beam spot size at the target distance be approximately the same as the minimum width between regions of different light reflectivity, i.e., the bars and spaces of the symbol.

The bar code symbols are formed from bars or elements typically rectangular in shape with a variety of possible widths. The specific arrangement of elements defines the character represented according to a set of rules and definitions specified by the code or "symbology" used. The relative size of the bars and spaces is determined by the type of coding used, as is the actual size of the bars and spaces. The number of characters per inch represented by the bar code symbol is referred to as the density of the symbol. To encode a desired sequence of characters, a collection of element arrangements are concatenated together to form the complete bar code symbol, with each character of the message being represented by its own corresponding group of elements. In some symbologies a unique "start" and "stop" character is used to indicate where the bar code begins and ends. A number of different bar code symbologies exist. These symbologies include UPC/EAN, Code 39, Code 128, Codabar, and Interleaved 2 of 5.

For the purpose of our discussion, characters recognized and defined by a symbology shall be referred to as legitimate characters, while characters not recognized and defined by that symbology are referred to as illegitimate characters. Thus, an arrangement of elements not decodable by a given symbology corresponds to an illegitimate character(s) for that symbology.

In order to increase the amount of data that can be represented or stored on a given amount of surface area, several new bar code symbologies have recently been developed. One of these new code standards, Code 49, introduces a "two-dimensional" concept by stacking rows of characters vertically instead of extending the bars horizontally. That is, there are several rows of bar and space patterns, instead of only one row. The structure of Code 49 is described in U.S. Pat. No. 4,794,239, which is hereby incorporated by reference.

A one-dimensional single-line scan, as ordinarily provided by hand-held readers, has disadvantages in reading these two dimensional bar codes; that is, the reader must be aimed at each row, individually. Likewise, the multiple-scan-line readers produce a number of scan lines at an angle to one another so these are not suitable for recognizing a Code 49 type of two-dimensional symbols.

In the scanning systems known in the art, the light beam is directed by a lens or similar optical components along a light path toward a target that includes a bar code symbol on the surface. The scanner functions by repetitively scanning the light beam in a line or series of lines across the symbol scanning component such as a mirror disposed in the light path. The scanning component may either sweep the beam spot across the symbol and trace a scan line across and past the symbol, or scan the field of view of the scanner, or do both.

Scanning systems also include a sensor or photodetector which functions to detect light reflected from the symbol. The photo-detector is therefore positioned in the scanner or in an optical path in which it has a field of view which extends across and slightly past the symbol. A portion of the reflected light which is reflected off the symbol is detected and converted into an electrical signal, and electronic circuitry or software decodes the electrical signal into a digital representation of the data represented by the symbol that has been scanned. For example, the analog electrical signal from the photodetector may typically be converted into a pulse width modulated digital signal, with the widths corresponding to the physical widths of the bars and spaces. Such a signal is then decoded according to the specific symbology into a binary representation of the data encoded in the symbol, and to the alphanumeric characters so represented.

The decoding process in known scanning systems usually work in the following way. The decoder receives the pulse width modulated digital signal from the scanner, and an algorithm implemented in software attempts to decode the scan. If the start and stop characters and the characters between them in the scan were decoded successfully and completely, the decoding process terminates and an indicator of a successful read (such as a green light and/or an audible beep) is provided to the user. Otherwise, the decoder receives the next scan, performs another decode attempt on that scan, and so on, until a completely decoded scan is achieved or no more scans are available.

SUMMARY OF INVENTION

Briefly, and in general terms, the invention provides a system and a method for reading bar code symbols or the like, including a scanner for generating a laser beam directed toward a target producing a narrow raster scanning pattern (or a single scanning line) that enables the user to manually aim and direct the beam to the location desired by the user, and a relatively wider raster scanning pattern (or a dual scanning line) that increases in height and sweeps an entire symbol to be read. The system further includes a detector for receiving reflected light from such symbol to determine whether a valid symbol has been scanned and to produce electrical signals corresponding to data represented by such symbol.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENT

As used in this specification and the following claims, the term "symbol" and "bar code" is intended to be broadly construed and to cover not only patterns composed of alternating bars and spaces of various widths, but also other one or two dimensional graphic patterns, as well as alphanumeric characters.

The invention generally relates to a scanner system having a light source for reading indicia of different light reflectivity such as bar code symbols. More particularly, the invention provides a scanner system in which adjustment of the spatial coverage of the raster scanning pattern of the scanning beam is automatically made to effect appropriate detection, sweeping and/or scanning of symbols to be read. The invention further provides a method for operating a scanner system by providing a signal to the current drive of the light source and the scan controller in response to detection of indicia which represents or may represent a portion of a desired target, such as a bar code symbol.

The present invention also relates to scanning systems incorporating techniques for automatically initiating and terminating scanning of the target. One feature of some scanner systems is the use of a manually operated trigger to initiate scanning of the target, such as described in U.S. Pat. No. 4,387,297. Although for many applications the use of a trigger is an important feature, there are some applications in which it may be desirable to use alternate activation techniques to initiating scanning, and such techniques are also within the scope of the present invention.

The present invention provides a method and apparatus for operating a scanning system in which two different types of bar codes may be read—a standard linear bar code, and a two-dimensional bar code. The present invention also provides a technique for determining the type of bar code and adjusting the spatial coverage or vertical sweep of the raster scanning beam in order to effect a sufficient sweep to fully read a two dimensional bar code.

Figure 1:
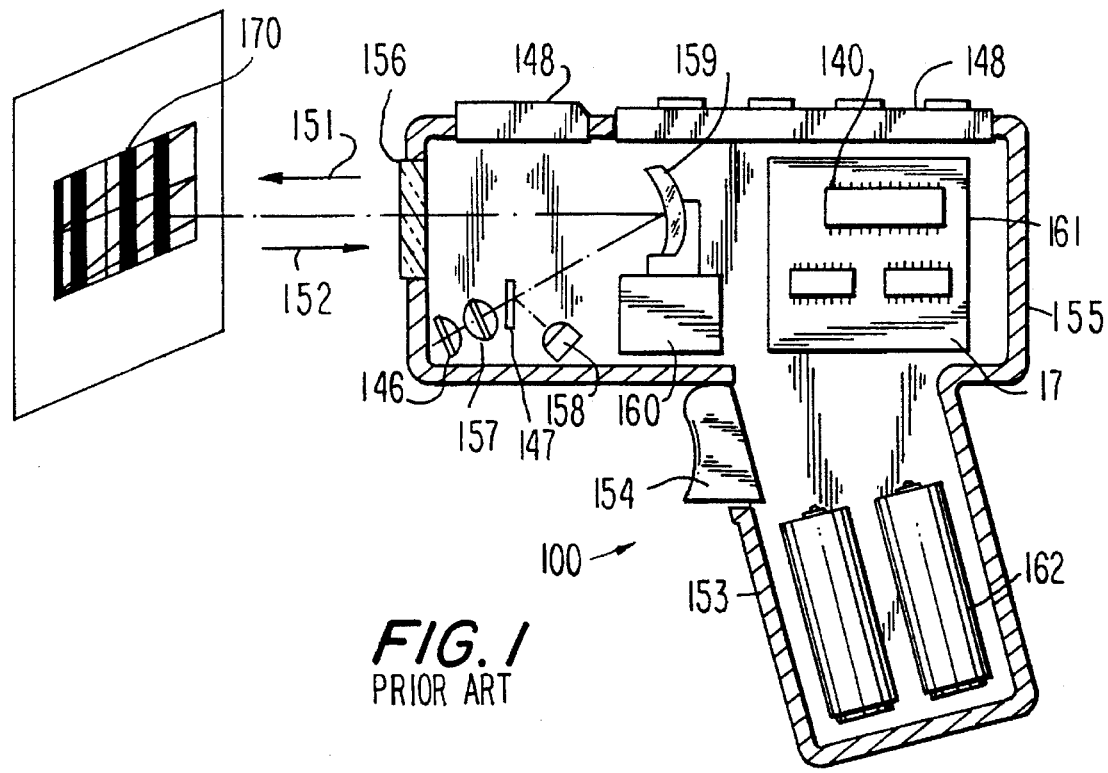
FIG. 1 is a highly simplified diagrammatic representation of a laser scanning system according to the prior art.

Referring to FIG. 1, there is shown a highly simplified embodiment of one type of bar code reader that may be designed according to the principles of the present invention. The reader 100 may be implemented in a hand-held scanner, as illustrated, or a desk-top workstation or stationary scanner. In the preferred embodiment, the arrangement is implemented in a housing 155 that includes an exit port 156 through which an outgoing laser light beam 151 is directed to impinge on, and to be scanned across, symbols 170 located exteriorly of the housing.

This hand-held device of FIG. 1 is generally of the style disclosed in U.S. Pat. No. 4,760,248, issued to Swartz et al, or in U.S. Pat. No. 4,896,026 assigned to Symbol Technologies, Inc., and also similar to the configuration of a bar code reader commercially available as part number LS 8100 or LS 2000 from Symbol Technologies, Inc. Alternatively, or in addition, features of U.S. Pat. No. 4,387,297 issued to Swartz et al, or U.S. Pat. No. 4,409,470 issued to Shepard et al, both such patents assigned to Symbol Technologies, Inc., may be employed in constructing the bar code reader unit of FIG. 1. These U.S. Pat. Nos. 4,760,248, 4,896,026 and 4,409,470 are incorporated herein by reference, but the general design of such devices will be briefly described here for reference.

Turning to FIG. 1 in more detail, an outgoing light beam 151 is generated in the reader 100, usually by a laser diode or the like, and directed to impinge upon a bar code symbol disposed on a target a few inches from the front of the reader unit. The outgoing beam 151 is scanned in a linear raster scan pattern in the present invention, and the user positions the hand-held unit so this scan pattern transverses the symbol to be read. Reflected and/or scattered light 152 from the symbol is detected by a light-responsive device 158 in the reader unit, producing serial electrical signals to be processed and decoded for reproducing the data represented by the bar code. As used hereinafter, the term "reflected light" shall mean reflected and/or scattered light.

In a preferred embodiment, the reader unit 100 is a gun shaped device, having a pistol-grip type of handle 153. A movable trigger 154 is employed to allow the user to activate the light beam 151 and detector circuitry when the user has positioned the device to point at the symbol to be read. A light-weight plastic housing 155 contains the laser light source 146, the detector 158, the optics 157, 147, 159 the signal processing circuitry including a symbol detector circuit 17, and the CPU 140 as well as power source or battery 162. A light-transmissive window 156 in the front end of the housing 155 allows the outgoing light beam 151 to exit and the incoming reflected light 152 to enter. The reader 100 is designed to be aimed at a bar code symbol by the user from a position in which the reader 100 is spaced from the symbol, i.e., not touching the symbol or moving across the symbol. Typically, this type of hand-held bar code reader is specified to operate in the range of perhaps several inches.

The reader 100 may also function as a portable computer terminal, and include a keyboard 148 and a display 149, such as described in the previously noted U.S. Pat. No. 4,409,470.

As further depicted in FIG. 1, a suitable lens 157 (or multiple lens system) may be used to focus the scanned beam unto the bar code symbol at an appropriate reference plane. A light source 146 such as a semiconductor laser diode is positioned to introduce a light beam into the axis of the lens 157, and the beam passes through a partially-silvered mirror 147 and other lenses or beam-shaping structure as needed, along with an oscillating mirror 159 which is attached to a scanning motor 160 activated when the trigger 154 is pulled. If the light produced by the source 146 is not visible, an aiming light may be included in the optical system. The aiming light, if needed, produces a visible-light spot which may be fixed, or scanned just like the laser beam; the user employs this visible light to aim the reader unit at the symbol.

Figure 2:
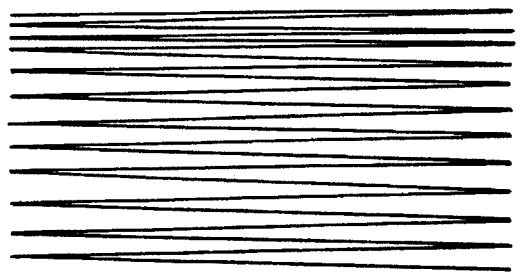
FIG. 2 is a diagram that depicts the scanning pattern of a raster scanner known in the prior art.

FIG. 2 is a diagram that depicts the scanning pattern of a raster scanner known in the prior art. Such a pattern may be generated by vertical (or y-direction) displacement of a linear scan line driven in the x-direction, such as described in U.S. Pat. No. 4,387,297. In the prior art such scan pattern is fixed during scanning and reading of the symbol.

Turning next to FIGS. 3a–3d, there is shown a sequence of views as a target containing a symbol is scanned by a raster scanning pattern to show the operation of the present invention in one embodiment.

Figure 6:
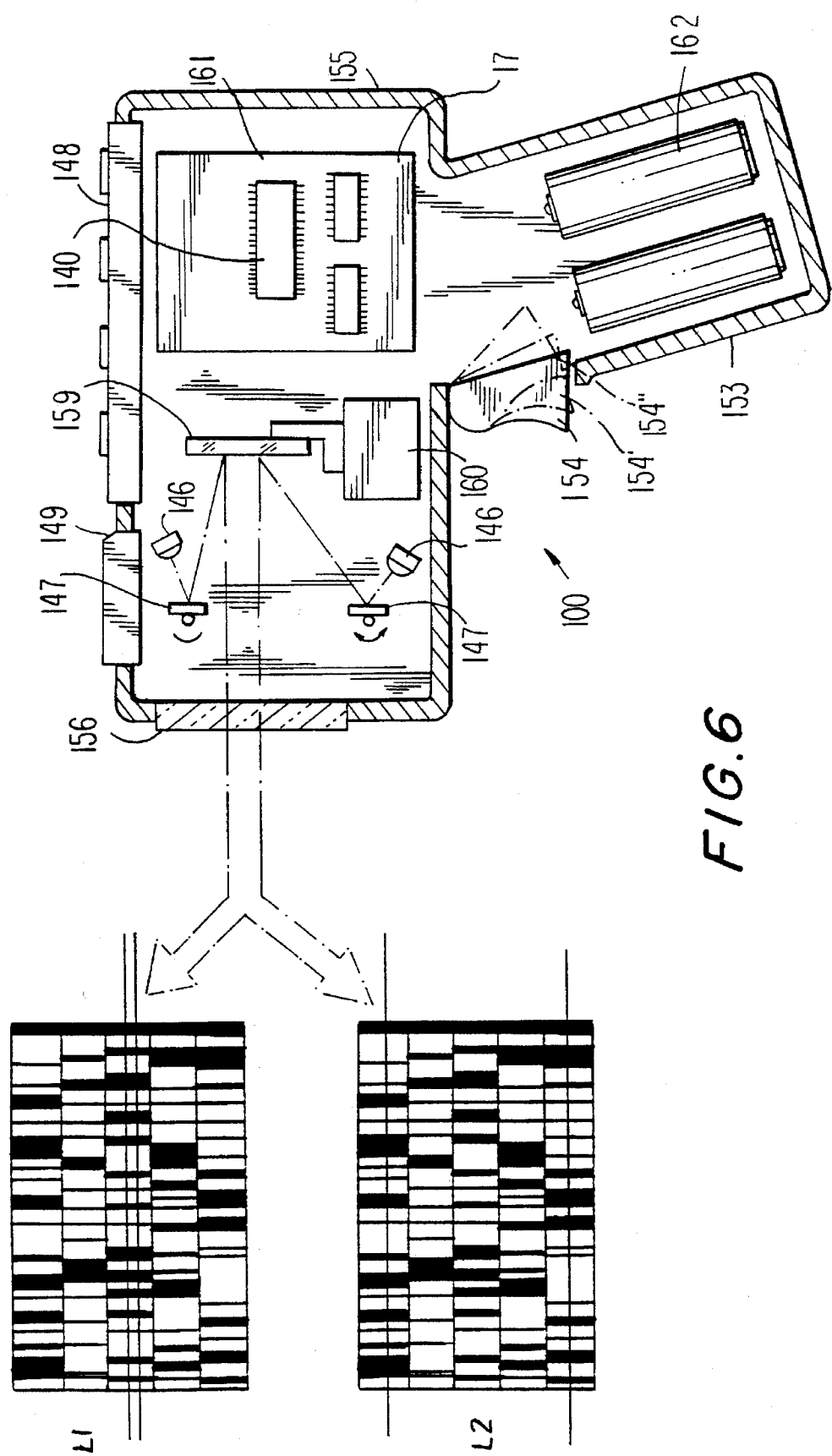
FIG. 6 is a scanner according to the present invention showing both X- and Y-axis scanning.

As suggested from the highly simplified discussion in connection with FIGS. 3a–3d, a feature of the present invention is to provide a circuit which is capable of sampling the reflected light from only one portion of a target and performing a computation or analysis on the detected electrical signal to determine if the detected portion is indicative that a bar code symbol has been detected. The preferred embodiment of such a detector circuit will be subsequently described with reference to FIG. 6.

One technique according to the present invention is to process the electrical signal to produce a test signal to determine if the reflected light of variable intensity represents a spatial variation of different light reflectivity that could be indicative of the presence of a predetermined indicia pattern such as a bar code symbol.

An enabling signal would then be generated if the test signal exceeds a predetermined reference signal. The light beam is then modified in response to the enabling signal in one or more respects as will be subsequently described.

Another technique is to process the electrical signal to produce a count of the number of transitions between portions of different light reflectivity during a predetermined time period. The count would be used to determine whether the reflected light of different light reflectivity is indicative of a presence of a predetermined indicia pattern such as a generic bar code symbol, a class of bar code symbols, or even a specific bar code symbol. An enabling signal would be generated if the count exceeds a predetermined minimum. Again, the light beam would be modified in response to the enabling signal.

Still another technique is to process the electrical signal to compute the ratio of the length of an indicia portion of low light reflectivity to one of high reflectivity to determine whether the reflected light of variable intensity represents a spatial variation of different light reflectivity that could be indicative of a presence of a predetermined indicia pattern and for generating an enabling signal if the ratio is less than a predetermined value. The raster scanning pattern would be modified in response to the enabling signal.

Yet another technique is to process the electrical signal to compare the signal from a first scan with the signal from a second subsequent scan to determine whether the reflected light of variable intensity over successive scans represents a substantially identical spatial variation of different light reflectivity that could be indicative of a presence of a predetermined indicia pattern. An enabling signal is generated if the comparison between a predetermined number of successive scans results in a close or nearly identical match. The light beam would be modified in response to the enabling signal. Yet another is to compare several scans to determine if similar scans come in groups, which would be indicative of a 2D bar code.

Figure 3A:
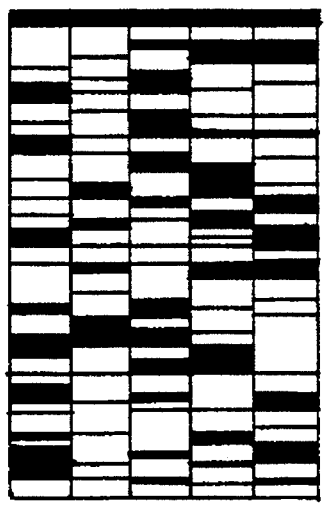
FIGS. 3a, 3b, 3c and 3d depict the raster scanning pattern during different time intervals during reading a two dimensional bar code according to the present invention.
Figure 3A:

FIG. 3a is a highly simplified schematic representation of the present invention during a first stage of operation in which a bar code symbol, in this example a two dimensional bar code symbol, is spaced apart from the scanning pattern of the emitted light, depicted as a "narrow" raster scanning pattern. By a "narrow" pattern, as used in this specification, we mean a pattern having a height (in the y-direction), much smaller than the length (in the x-direction) of the scanning pattern.

Figure 3B:
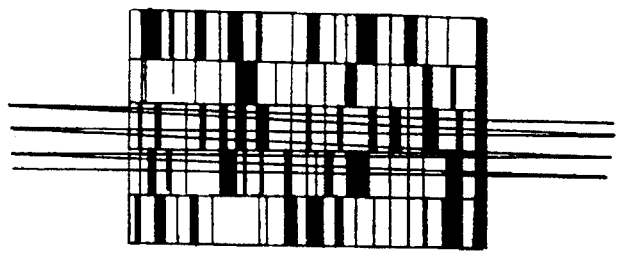

The operation of the present invention begins when a portion of a coded indicia is present in the scanning pattern, i.e. at the second stage shown in FIG. 3b. If the scanner is hand-held, the user, moves the scanner and positions it so that the scanning beam is directed to the location of the coded indicia. A portion of a coded indicia will be present in the scanning pattern of the emitted light from the scanner as shown in FIG. 3b. If the scanner is stationary, the user will move the target into the position of the pattern. If no bar code is detected, the user may also seek to vary the distance between the scanner and the target, since the working range of the scanner may be limited even though the scanning pattern illuminates the bar code. The algorithm according to the present invention will further indicate that in this example a two dimensional bar code has apparently been detected, and will shift operation of the apparatus into a third stage of operation.

There are two ways to perform this operation. The first way is to decode the first row and determine on the basis of the decoded information whether the bar code is a one dimensional or two dimensional bar code. The second way is to utilize an intelligent sensing algorithm which is capable of determining on the basis of the code words detected and decoded whether the portion read is a portion of a one dimensional or a two dimensional bar code.

Figure 3C:
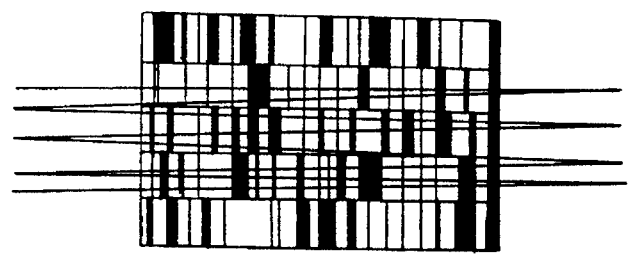

FIG. 3c is a highly simplified schematic representation of the operation of the apparatus of the present invention during a third stage of operation in which the raster scanning pattern has increased in height so that a greater vertical dimension of the bar code is present in the scanning pattern of the emitted light. The bar code rows which are present in the scanning pattern will be read, decoded, and interpreted to determine whether an entire two dimensional bar code symbol has been scanned, as will be subsequently described.

Figure 3D:
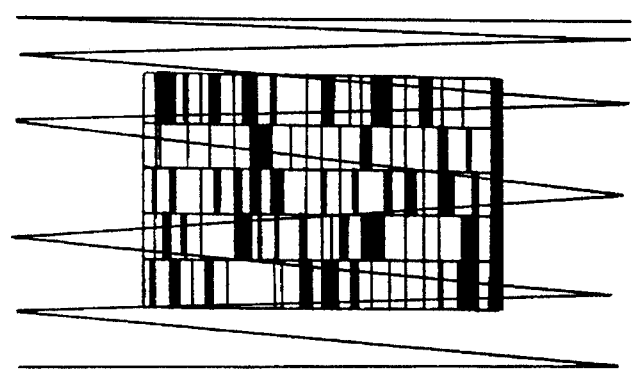

FIG. 3d is a highly simplified schematic representation of the operation of the apparatus of the present invention during a fourth stage of operation after the raster height has increased further and the entire bar code is present in the scanning pattern of the emitted light. After the entire bar code is read and decoded, the raster pattern will be terminated, or alternatively become narrow or compress in height so that only a portion of the indicia will be covered by the beam.

As suggested from the highly simplified discussion in connection with FIGS. 3a–3d, a feature of the present invention is to provide a circuit which is capable of sampling the reflected light from only a portion of a symbol and performing a computation or analysis to determine if the detected portion is indicative that a one or two dimensional bar code symbol has been detected. According to the embodiment shown in FIGS. 3a–3d, the result of the computation or analysis by an algorithm may be used to change the raster height between the second and third stages, as well as between the third and fourth stages of operation in the event a two dimensional bar code has been detected.

Figure 4:
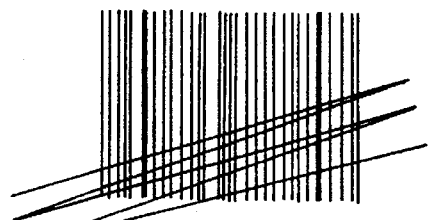
FIG. 4 is a pictorial representation of the raster scanning beam traversing a one dimensional bar code.

FIG. 4 depicts the raster scanning pattern traversing a one dimensional bar code, and more particularly a bar code which is skewed or misaligned with respect to the direction of scanning of the scan lines. It is noted by inspection of the Figure that even if the scan lines are not orthogonal to the bar code's vertical bars, successive scan lines still read the same sequence of bars and spaces. Such fact is used by the algorithm of the present invention to conclude that a one dimensional bar code has been detected.

FIGS. 5a, 5b, 5c and 5d are pictorial representations of the raster scanning beam traversing a two dimensional bar code which is misaligned with respect to the direction of scan, and depicting the process according to the present invention of reorienting the direction of scan until the scan pattern is aligned with the bar code.

Figure 5A:
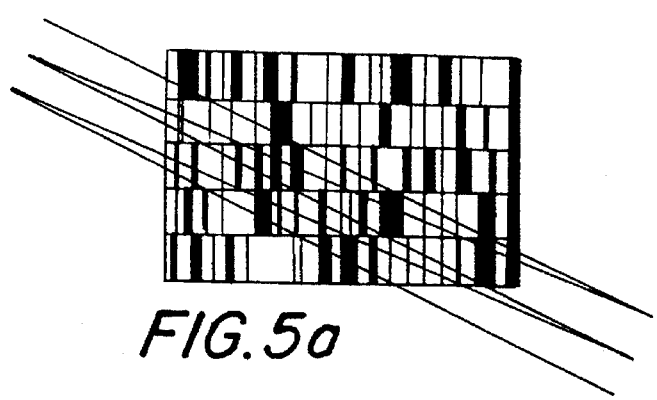
FIGS. 5a, 5b, 5c and 5d are pictorial representations of the raster scanning beam traversing a two dimensional bar code which is misaligned with respect to the direction of scan, and re-orienting the direction of scan.

FIG. 5a is a highly simplified schematic representation of the raster scanning pattern of the present invention during a first stage of operation in which the position of the two dimensional bar code is skewed or misaligned with respect to the direction of the raster scanning pattern.

Figure 5B:

The operation of the present invention begins when the algorithm determines that a skewed bar code is present. Reference is made here to co-pending U.S. patent application Ser. No. 08/000,794, filed Jan. 14, 1993, which is a continuation of Ser. No. 07/317,433, now abandoned for a device and method for reading skewed two dimensional bar codes. The circuitry and optical components as described in such application may be utilized in the present invention to reorient the raster scanning pattern, as shown in FIG. 5b. Further analysis is performed on data received from the new orientation, and if it is determined the pattern is still skewed, the scanning pattern will again be reoriented in an interactive process until it is finally aligned with the bar code as shown in the position of FIG. 5c.

Figure 5C:
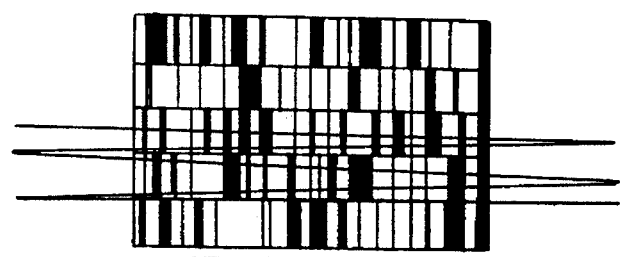

FIG. 5c is a highly simplified schematic representation of the operation of the apparatus of the present invention during a third stage of operation in the which raster scanning pattern has been reoriented so that the rows of the two dimensional bar code are parallel to the scanning pattern. The bar code rows which are present in the scanning pattern will be read, decoded, and interpreted, as described in connection with FIG. 3b.

Figure 5D:
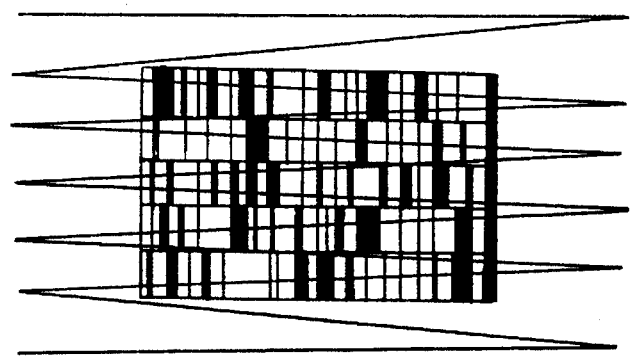

FIG. 5d is a highly simplified schematic representation of the operation of the apparatus of the present invention during a fourth stage of operation after the raster height has increased further and the entire bar code is present in the scanning pattern of the emitted light. After the entire bar code is read and decoded, the raster pattern will narrow so that only a portion of the indicia will be covered by the beam.

The present invention also permits a relatively bright, small height rectangular laser raster scanning pattern to be used to enable the user to aim and direct the beam toward a bar code symbol to be read. The beam then proceeds to scan the symbol, and the device detects light reflected from the symbol and generates an electrical signal in response to the reflected light. The signal is processed and interpreted, and control circuitry modifies the height of the raster scan pattern in response to the electrical signal.

The aiming and scanning feature using a small height raster scanning pattern may be implemented with different activation or triggering modes, which has been described in detail in previous applications.

There are a number of possible scanning modes that may be implemented in connection with hand-held or fixed mount laser scanners: (a) the normal trigger mode; (b) the trigger spot and scan mode; and (c) the dual position trigger mode. Modes (a) and (b) have been described in U.S. patent application Ser. No. 349,860 filed May 10, 1989, abandoned, in connection with an integrated scanning terminal, but such scanning modes are equally applicable to other types of scanners. Mode (c) has been described in U.S. patent application Ser. No. 544,628, filed Jun. 27, 1990, now U.S. Pat. No. 5,117,098, in connection with a long-range scanner, and again such a scanning mode is equally applicable to other types of scanners.

In the normal triggered mode, the laser beam is normally off. A trigger is used in the normal triggered mode to initiate the rapid and repetitive scanning of the target symbol. For proper counting, it is necessary to distinguish between the situation in which many scans have been performed on a single object, or the situation in which one or more scans have been performed on a plurality of objects with identical symbols. The capability of sensing each object to be scanned in its turn is critical for successful applications of bar code scanning in data collection, inventory, and similar applications.

As is known in prior art scanners (such as described in U.S. Pat. No. 4,387,297) a trigger is operative for actuating the scanning means to repetitively sweep the bar code symbol a number of times each time the trigger is actuated. The trigger is preferably a manually-depressible switch mounted on the housing in the vicinity of the interconnection of the barrel and handle portions of the housing. The trigger switch is located on the handle portion such that the forefinger of the user's hand can be used to manually depress the switch. Each time the switch is depressed the scanning means sweeps the symbol many times, until a complete decode or a time out is reached.

In the normal triggered mode, when the decode circuitry successfully decodes the symbol, the decode circuitry generates a successful decode signal and may actuate an indicator located in the scanner. The indicator may be an auditory-type beeper and/or a light emitting diode. When the beeper sounds and/or when the diode lights up, then the user knows that the scanning for that particular symbol has been terminated.

In the triggered spot and scan mode, such as described in U.S. patent application Ser. No. 260,692, filed Oct. 21, 1988, now U.S. Pat. No. 4,933,538 after the trigger is pulled, the beam only comes on at a narrow scanning angle. In such an operational mode, a very bright, short line about 1" in length is formed by the narrow laser scanning beam. The bright small line formed on the target is used by the user holding the laser scanner to manually aim and direct the beam to the specific location on the target where the user actually sees the bar code is located. When an indicia pattern indicative of a bar code symbol has been detected, the beam will automatically widen, thereby sweeping the entire symbol so that it can be decoded.

In the dual position trigger mode, the trigger has a first and a second operational position. If the trigger is pulled to a first position the beam is directed in a fixed, non-scanning path to form a narrow aiming beam. In such an operational mode, a very bright spot is formed by the narrow beam. The bright spot is used by the user holding the laser scanner to manually aim and direct the beam to the location where the user actually sees the bar code is located. Typically the user will position the spot approximately at the center of the bar code. The user will then pull the trigger to a second position to initiate scanning. When the second position of the trigger is reached, the beam will widen to sweep the entire symbol so that it can be decoded. Although in some cases the beam may be dimly reflective or not visible to the user, since the beam has already been positioned, the sweep will cover the symbol and decode will take place.

In the present invention, the narrow scanning pattern will function as an aiming beam and as a range orientation detector. The pattern will not open up unless it is within the proper range and orientation, thus providing a method for teaching the operator the right orientation of a hand-held scanner to correctly read a bar code symbol.

The algorithm according to the present invention is preferably implemented in software, and executed by the CPU 140 in the scanner. The flow chart in FIG. 7 can be used to control the scanner to scan among one dimensional bar codes, and two dimensional (or "stacked") barcodes.

The algorithm minimizes the amount of processing that would be done on the data provided from the scanner, and thus reduces the latency the system will have in fully reading a barcode symbol. Another feature of the algorithm is to provide a method to control operational parameters of the scanning system, such as horizontal and vertical scan angles, in response to the type of barcode that is determined to be scanned.

Figure 7:
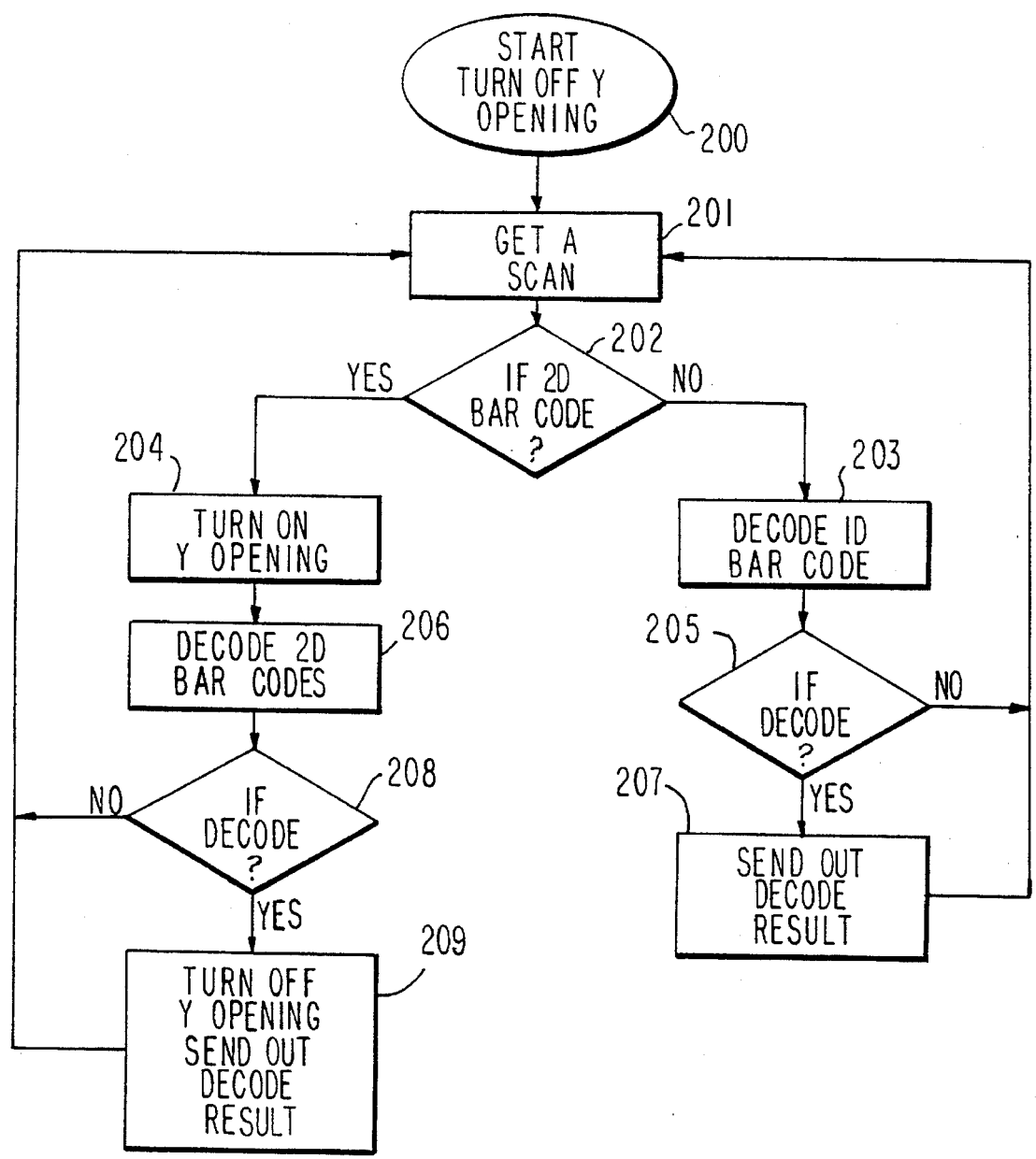
FIG. 7 is a flow chart for use in controlling a scanner to scan one and two dimensional bar codes.

FIG. 7 illustrates an operational flow chart for a scanner operative for scanning along a predetermined direction lengthwise of an indicium, e.g., a bar code symbol, to be read (also known as X-axis scanning), and for scanning in a transverse direction which is orthogonal to the predetermined direction (also known as Y-axis scanning). As described, for example, in U.S. Pat. No. 4,387,297, individual X-axis scan means and Y-axis scan means may be utilized to obtain a scan pattern of any desired shape. Thus, if the X-axis scan means is solely operated, then only a generally linear scan line will be generated at the symbol. If the X- and Y-axis scan means are driven at uniform rates of speed, then a raster-type scan pattern, comprising a set of generally parallel scan lines, extending both along the length and height of the symbol, will be generated. If the X- and Y-axis scan means are driven at sinusoidally varying rates of speed, then a Lissajous-type omnidirectional scan pattern is generated at the symbol. Reference is also made to U.S. patent application Ser. No. 520,464, filed May 8, 1990, now U.S. Pat. No. 5,168,149, incorporated herein by reference.

Of course, other types of scan patterns are comprehended within the spirit of this invention. For example, the X-axis scan means need not generate a single scan line as the X-axis scan pattern, but, instead, can generate a plurality of mutually parallel scan lines as the X-axis scan pattern. This plurality of scan lines is spaced apart over a relatively short first distance across the height of the symbol. In the case where the Y-axis scan pattern is also constituted of a set of mutually parallel scan lines spaced apart of each other over a second distance along the height of the symbol, this second distance is greater than the first distance. Thus, a variety of raster-type scan patterns may be generated, one of reduced height for X-axis scanning, and others of various increased heights for Y-axis scanning.

As used in FIG. 7, the term "Y opening" signifies operation of the Y-axis scan means to change the height of the raster scanning pattern.

Block 200 in FIG. 7 represents the first step in the algorithm at the onset of scanning. In the case of a hand-held scanner, scanning is typically initiated by manual actuation of a trigger. There is either no Y-axis scanning or a constant y-axis scanning at this time, i.e., no increase in height of the raster scanning pattern.

Block 201 represents the next sequential step in the algorithm corresponding to operation of the X-axis scan means and acquiring the data resulting from a single scan across the target.

Block 202 represents the next step of the above-mentioned algorithm for distinguishing between one-dimensional and two-dimensional bar code symbols. If the algorithm determines that the symbol is not two dimensional, then block 203 represents the attempted decoding of the one-dimensional symbol. If the one-dimensional symbol is successfully decoded at the stage of block 205, then the decoded data is sent out to the next stage at block 207 for further processing. If the one-dimensional symbol is not successfully decoded at block 205, then the X-axis scan means at block 201 remains operational until a successful decode has occurred, or until a predetermined amount of time has elapsed.

If the algorithm at block 202 determines that the symbol is two dimensional, then the Y-axis scan means is actuated at block 204. Block 206 represents the attempted decoding of the two-dimensional symbol. If the two-dimensional symbol is successfully decoded at block 208, then the decoded data is sent out at block 209 for further processing and, concomitantly, the Y-axis scan means is deactuated. If the two-dimensional symbol is not successfully decoded at block 208, then the Y-axis scan means remains operational until a successful decode has occurred or until a predetermined amount of time has elapsed. The predetermined amount of time is typically on the order of three (3) seconds, which would be regarded as sufficient time for an operator to sight the symbol and obtain a successful decode.

Figure 8:
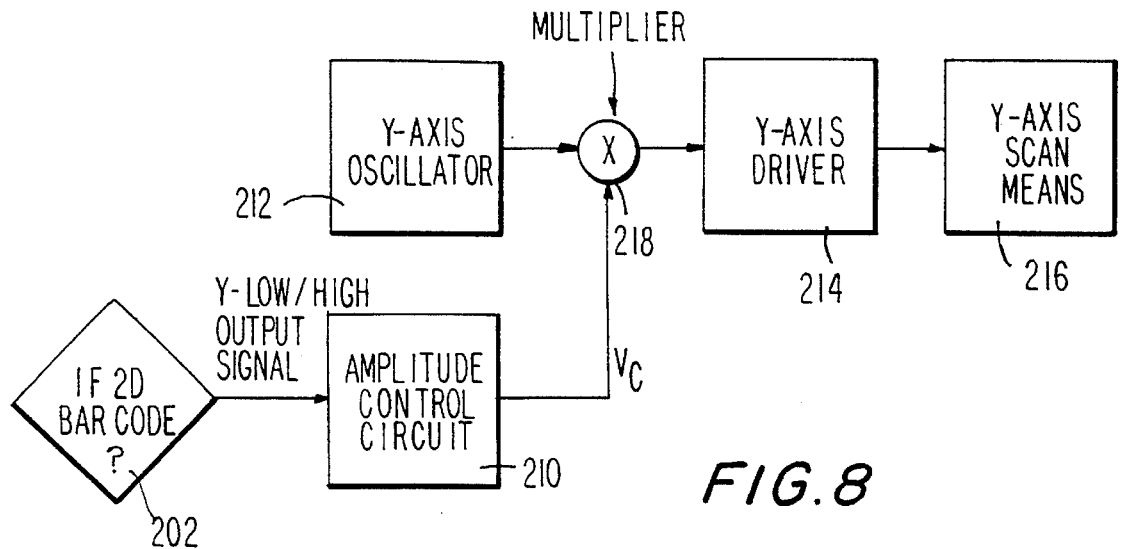
FIG. 8 is a block diagram of a circuit utilized in connection with the algorithm according to the present invention.

Turning now to FIG. 8, in a preferred embodiment, the aforementioned block 202 which depicts the algorithm for distinguishing between one-dimensional and two-dimensional bar code symbols generates a digital output signal which has either a HIGH state or a LOW state, depending on whether a one-dimensional or a two-dimensional symbol is respectively detected. This output signal is conducted to an amplitude control circuit 210 (shown in detail in FIG. 10) operative for generating a control signal $V_c$ (shown graphically as a function of time in FIG. 9).

Returning to FIG. 8, an oscillator 212 for Y-axis operation is operative for generating the basic driving signal for operating a Y-axis driver 214 and, in turn, the Y-axis scan means 216. The driving signal has a periodic waveform, e.g. sinusoidal, triangular, etc. The driving signal is fed together with the control signal $V_c$ to a multiplier 218. The control signal $V_c$ controls the amplitude of the driving signal.

Another important feature of the invention is to teach the operator of the scanner the correct range and orientation of the scanner to read symbols quickly and accurately, so a feed-back signal (an audible "beep" or a visual indicator) may be actuated when a symbol is detected in range.

As previously described, the preferred embodiment generates a first raster-scan of reduced height for X-axis scanning and a second raster-scan of increased height for Y-axis scanning. In this case, when a two-dimensional bar code symbol is detected, the height or Y dimension of the raster pattern grows linearly from an initial amplitude $V_1$ until the final height of amplitude $V_2$ is reached. The control signal needed to perform this operation is depicted in FIG. 9.

Figure 9:
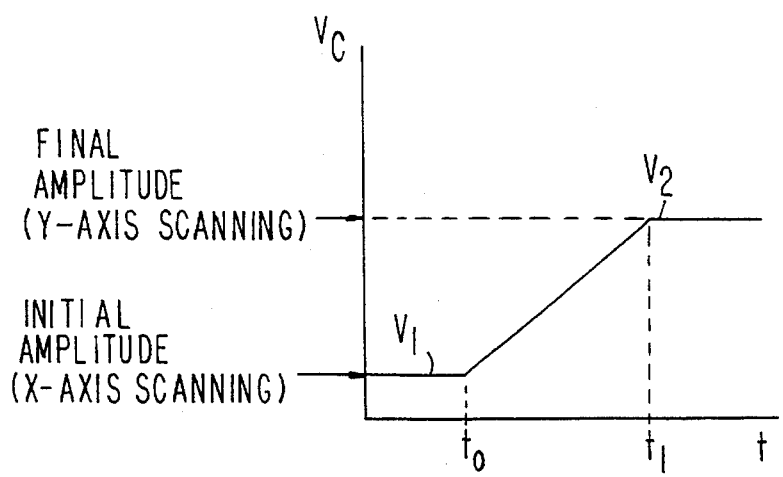
FIG. 9 is a graph depicting a control signal utilized in connection with the circuit of FIG. 8.
Figure 10:
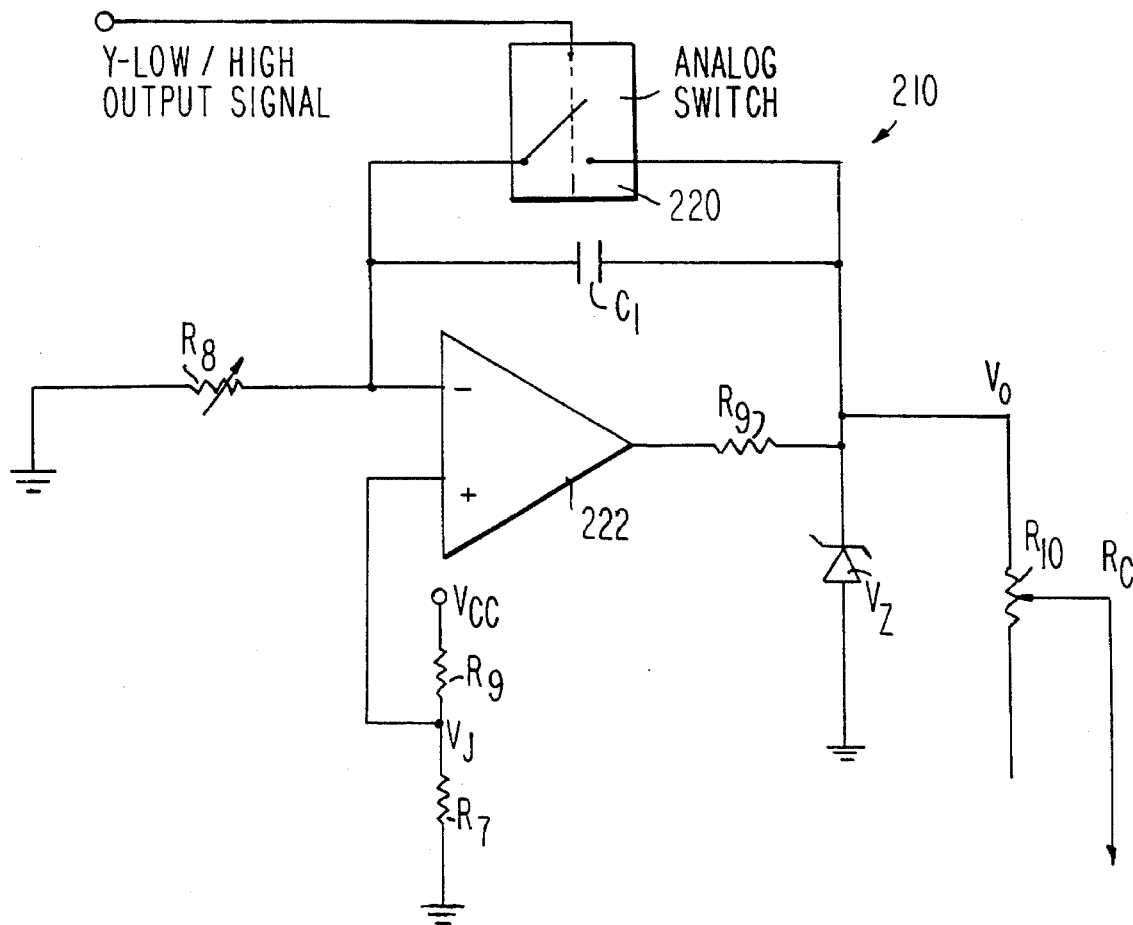
FIG. 10 is a schematic diagram of a circuit for generating the control signal of FIG. 9.

FIG. 10 shows the amplitude control circuit 210 operative for generating the control signal $V_c$ depicted in FIG. 9. The output signal from block 202 is conducted to an analog switch 220 which is connected in parallel across a charging capacitor $C_1$.

An OP Amp 222 has one input connected to ground through a variable resistor $R_8$, and another input connector to a junction between resistor $R_6$ and $R_7$. The other end of resistor $R_6$ is connected to a supply voltage $V_{cc}$; and the other end of resistor $R_7$ is connected to ground. A voltage $V_j$ appears at the junction between resistors $R_6$ and $R_7$.

The output of the OP Amp 222 is connected to a zener diode through a resistor $R_9$, and also to one side of the capacitor $C_1$. An output voltage $V_o$ is connected to ground through a potentiometer $R_{10}$ from whose wiper arm the control voltage $V_c$ is taken.

In operation, when no two-dimensional bar code symbol is detected, the output signal from block 202 is set to the LOW state, thereby closing the switch 220 and discharging $C_1$. $V_o$ is then equal to $V_j$ which is set by $V_{cc}$, $R_6$ and $R_7$.

When a two-dimensional bar code symbol is detected, the output signal of block 202 is set to the HIGH state, which opens the switch 220, thereby allowing $C_1$ to charge up at a rate set by $V_j$, $R_8$ and $C_1$. During this time, the circuit is operating as a linear integrator and the voltage $V_o$ will grow linearly. Eventually, $V_o$ will reach the breakdown voltage $V_z$ of the zener diode and will no longer rise. $R_9$ limits the current in the zener diode to safe levels. The voltage $V_o$ will then remain at the voltage $V_z$ until the switch 220 is again closed which will rapidly discharge $C_1$ and force $V_o$ to be equal to $V_j$. $R_{10}$ is provided to scale the voltage $V_o$ to the desired voltage $V_c$.

The above described method of operation assures that the scan line is positioned by the user at approximately the vertical midpoint of the bar code. An additional embodiment of the present invention contemplates that a user may not in fact accurately position the scan line at the midpoint, but closer to the top or bottom edge. Such an embodiment provides an algorithm to determine how the raster scan is implemented in both the y-positive and y-negative directions; for example, the raster scan may grow in the positive and negative directions at different rates depending upon the position along the Y-axis of the initial scan line. The position of the initial scan line may be determined by reading the row number of the 2D bar code, and an algorithm employed to determine whether the most efficient expansion of the raster scan pattern would be to grow the pattern at different rates on either side of the initial scan line. As an example, if the initial scan line was determined to be on the third row of a 2D bar code the algorithm would specify that the growth of the raster scan pattern in the y-negative direction would be considerably greater than the growth in the y-positive direction. The implementation of such an algorithm and the specification of the growth rates based upon the row of the initial scan line are all within the skill of those familiar with the art of decoding 2D bar code symbols and will not be described in detail here.

Turning next to FIGS. 11a–d and FIGS. 12a–d, there is shown a sequence of views in FIGS. 11a–d as a target containing a symbol is scanned by a raster scanning pattern to show the onset of the operation of the present invention in terms of the line density (shown in FIGS. 12a–d) as different stages of operation corresponding to an increasing height.

Figure 11A:
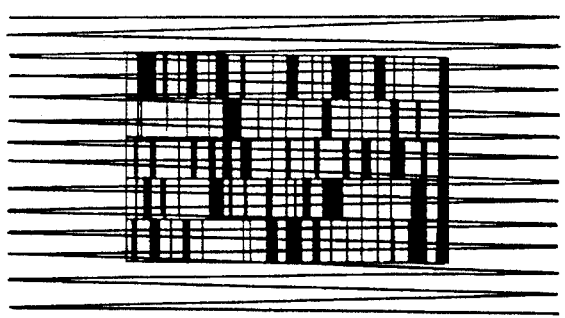
FIGS. 11a, 11b, 11c and 11d depict various types of raster scanning pattern traversing a two dimensional bar code for comparative illustration.
Figure 12A:
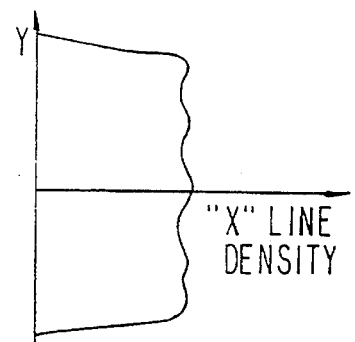
FIGS. 12a, 12b, 12c and 12d are graphic representations of the density of scan lines at positions along the y-axis of the scan patterns of FIGS. 11a, 11b, 11c and 11d respectively.
Figure 11B:
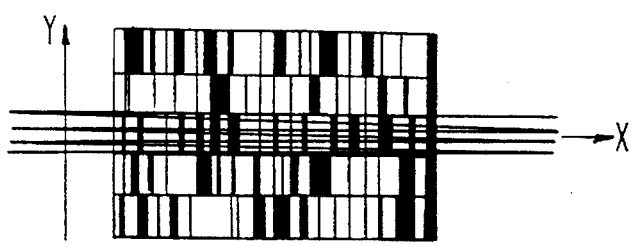
Figure 11C:
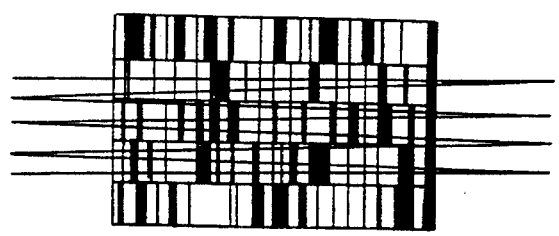
Figure 11D:
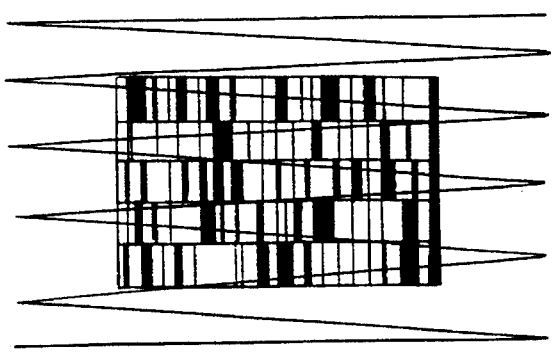

FIG. 11a is a highly simplified schematic representation of the integration over time of the scanning patterns of FIGS. 11b, 11c, and 11d resulting in average uniform density. The line density (or number of raster scanning lines per unit vertical dimension) is shown graphically in FIG. 12a immediately to the right of FIG. 11a.

Figure 12B:
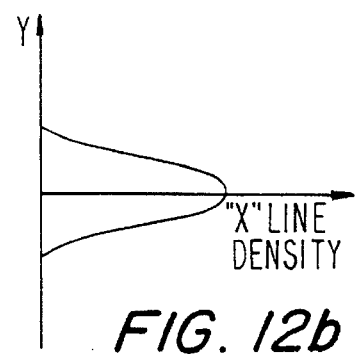

FIG. 11b is a highly simplified schematic representation of the scanning pattern of the raster scanning pattern embodiment of the present invention during a first stage of operation in which a bar code symbol, in this example a two dimensional bar code symbol, is contained within the scanning pattern of the emitted light. FIG. 12b depicts the line density of the scanning pattern shown in FIG. 11b.

Figure 12C:
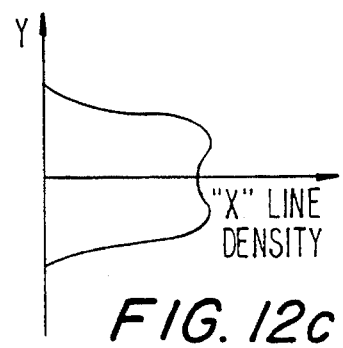

FIG. 11c is a highly simplified schematic representation of the operation of the apparatus of the present invention during a second stage of operation in which the raster scanning pattern has increased in height so that a greater vertical dimension of the bar code is present in the scanning pattern of the emitted light. The bar code rows which are present in the scanning pattern will be read, decoded, and interpreted to determine whether an entire two dimensional bar code symbol has been scanned, as has been previously described. FIG. 12c depicts the line density of the scanning pattern shown in FIG. 11c.

Figure 12D:
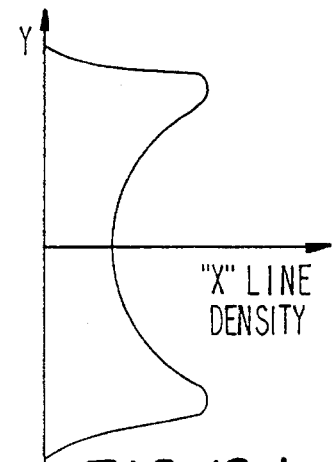

FIG. 11d is a highly simplified schematic representation of the operation of the apparatus of the present invention during a third stage of operation in which the raster pattern height has increased further and the first and last rows of the two dimensional bar code is present in the scanning pattern of the emitted light. After the entire bar code is read and decoded, the raster pattern will be terminated, or alternatively become narrow height. FIG. 12d depicts the line density of the scanning pattern shown in FIG. 11d.

Figure 13A:
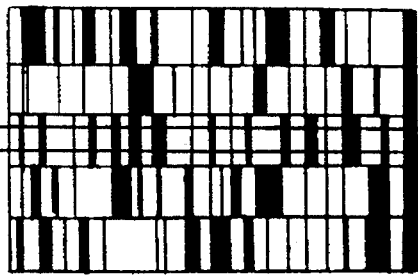
FIGS. 13a, 13b, and 13c depict a dual line scanning pattern that functions in a similar manner to the raster scanning pattern of FIG. 3.
Figure 13B:
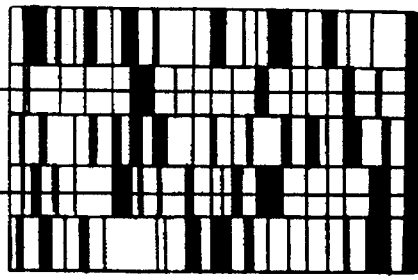
Figure 13C:
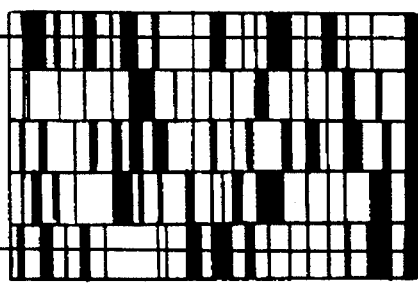

Turning next to FIGS. 13a–c there is shown a sequence of views as a target containing a symbol is scanned by a dual line scanning pattern to show the operation of the present invention in another embodiment.

FIG. 13a is a highly simplified schematic representation of scanning pattern of the dual line embodiment of the present invention during a first stage of operation in which a bar code symbol, in this example a two dimensional bar code symbol, is contained within the scanning pattern of the emitted light, two lines spaced a narrow distance apart.

There are different methods for generating a dual line scanning pattern. The first method, as shown in FIG. 14, is to utilize two lasers with 146, 146' each laser associated with one of the two line scanning patterns L1, L2. Each laser could be alternately activated so that at any given time only one laser beam is directed to the target. A second approach is to utilize a single laser with any optical mechanism which scans the target alternately with one of the two scan lines and then the other. Such an optical mechanism may be, for example, a scanning mirror 146g, 146b which is tilted between two angles. Each position of such mirror corresponds to one of the scanning paths. The angle may be increased over time so that the distance between the two scan lines increases from any initial value to a maximum value. Reference may be made to U.S. Pat. No. 4,871,904 to disclose the use of two mirrors in any optical path for changing a scan pattern. In the implementation section in the present invention the two mirrors are not operated simultaneously, but the mirror is shifted between two fixed positions and only when such mirror has been placed in such fixed position would the second mirror associate with the longitudinal scanning line being activated.

As has been discussed in connection with FIGS. 3a–d, the detector circuit 17 is now operative to detect a portion of a symbol and functions to generate a symbol detect enable signal if a bar code has been detected. The algorithm according to the present invention will further indicate that in this example a two dimensional bar code has apparently been detected, and will shift operation of the apparatus into the next stage of operation.

FIG. 13b is a highly simplified schematic representation of the operation of the apparatus of the present invention during a second stage of operation after the dual scanning pattern has increased in height so that a greater vertical dimension of the bar code is present in the scanning pattern of the emitted light. The bar code rows which are present in the scanning pattern will be read, decoded, and interpreted to determine whether an entire two dimensional bar code symbol has been scanned, as has been previously described.

FIG. 13c is a highly simplified schematic representation of the operation of the apparatus of the present invention during a third stage of operation after the dual line height has increased further and the first and last rows of the two dimensional bar code is present in the scanning pattern of the emitted light. After the entire bar code is read and decoded, the dual line pattern will be terminated, or alternatively become narrow height.

Although the present invention has been described with respect to reading one or two dimensional bar codes, it is not limited to such embodiments, but may also be applicable to more complex indicia scanning applications. It is conceivable that the method of the present invention may also find application for use with various machine vision or optical character recognition applications in which information is derived from other types of indicia such as characters or from the surface characteristics of the article being scanned.

In all of the various embodiments, the elements of the scanner may be assembled into a very compact package that allows the scanner to be fabricated as a single printed circuit board or integral module. Such a module can interchangeably be used as the laser scanning element for a variety of different types of data acquisition systems. For example, the module may be alternately used in a hand-held scanner, a table top scanner attached to a flexible arm or mounting extending over the surface of the table or attached to the underside of the table top, or mounted as a subcomponent or subassembly of a more sophisticated data acquisition system.

The module would advantageously comprise a laser/optics subassembly mounted on a support, a scanning element such as a rotating or reciprocating mirror, and a photodetector component. Control or data lines associated with such components may be connected to an electrical connector mounted on the edge or external surface of the module to enable the module to be electrically connected to a mating connector associated with other elements of a data acquisition system.

An individual module may have specific scanning or decoding characteristics associated with it, e.g. operability at a certain working distance, or operability with a specific symbology or printing density. The characteristics may also be defined through the manual setting of control switches associated with the module. The user may also adapt the data acquisition system to scan different types of articles or the system may be adapted for different applications by interchanging modules on the data acquisition system through the use of the simple electrical connector.

The scanning module described above may also be implemented within a self-contained data acquisition system including one or more such components as keyboard, display, printer, data storage, application software, and data bases. Such a system may also include a communications interface to permit the data acquisition system to communicate with other components of a local area network or with the telephone exchange network, either through a modem or an ISDN interface, or by low power radio broadcast from the portable terminal to a stationary receiver.

It will be understood that each of the features described above, or two or more together, may find a useful application in other types of scanners and bar code readers differing from the types described above.

While the invention has been illustrated and described as embodied in it is not intended to be limited to the details shown, since various modifications and structural changes may be made without departing in any way from the spirit of the present invention.

Without further analysis, the foregoing will so fully reveal the gist of the present invention that others can readily adapt it for various applications without omitting features that, from the standpoint of prior art, fairly constitute essential characteristics of the generic of specific aspects of this invention and, therefore, such adaptions should and are intended to be comprehended within the meaning and range of equivalence of the following claims.

What is claimed is:

1. A system for reading indicia having parts of different light reflectivity, comprising:

pattern generator means operative, in a first operational state, for generating a first scanning light pattern having a pair of scan lines each extending along a predetermined direction lengthwise of an indicium, said scan lines being spaced apart by a first distance along a transverse direction generally perpendicular to the predetermined direction, and for directing the first scanning pattern toward the indicium for reflection therefrom, said pattern generator means being further operative, in a second operational state, for generating a second scanning light pattern in which the scan lines are spaced apart by a second distance greater than said first distance along the transverse direction, and for directing the second scanning pattern toward the indicium for reflection therefrom;

means for detecting at least a portion of light reflected off the indicium from at least one of the scanning patterns, and for generating an electrical signal corresponding to data indicative of the indicium being read; and control means for processing the electrical signal to determine whether the data indicates that the indicium is a two-dimensional bar code symbol, and for automatically controlling the pattern generator means to change from the first operational state to the second operational state upon the determination that the indicium is a two-dimensional bar code symbol.

2. The system as defined in claim 1, wherein the pattern generator means includes two light sources for generating two laser beams, and means for forming the scan lines of each pattern from each laser beam.

3. The system as defined in claim 1, wherein the two-dimensional bar code symbol includes a plurality of ordered rows of codewords, each row extending along said predetermined direction, said rows being successively arranged from an uppermost row along the transverse direction to a lowermost row, and wherein the scan lines of said second scanning pattern sweep over the uppermost and lowermost rows.

4. A method of reading indicia having parts of different light reflectivity, comprising the steps of:

generating, in a first operational state, a first scanning light pattern having a pair of scan lines each extending along a predetermined direction lengthwise of an indicium, said scan lines being spaced apart by a first distance along a transverse direction generally perpendicular to the predetermined direction, and directing the first scanning pattern toward the indicium for reflection therefrom, generating, in a second operational state, a second scanning light pattern in which the scan lines are spaced apart by a second distance greater than said first distance along the transverse direction, and directing the second scanning pattern toward the indicium for reflection therefrom, detecting at least a portion of light reflected off the indicium from at least one of the scanning patterns, and generating an electrical signal corresponding to data indicative of the indicium being read, and processing the electrical signal to determine whether the data indicates that the indicium is a two-dimensional bar code symbol, and automatically changing from the first operational state to the second operational state upon the determination that the indicium is a two-dimensional bar code symbol.

5. The method as defined in claim 4, including the steps of generating two laser beams, and forming the scan lines of each pattern from each laser beam.

6. The method as defined in claim 4, wherein the two-dimensional bar code symbol includes a plurality of ordered rows of codewords, each row extending along said predetermined direction, said rows being successively arranged from an uppermost row along the transverse direction to a lowermost row, and wherein the pattern generating steps are performed by positioning the scan lines of said second scanning pattern apart along the transverse direction to a position wherein the scan lines sweep over the uppermost and lowermost rows.

* * * * *